United States Patent
Yamada et al.

(10) Patent No.: US 9,583,134 B2
(45) Date of Patent: Feb. 28, 2017

(54) MAGNETIC RECORDING AND REPRODUCING DEVICE

(71) Applicant: KABUSHIKI KAISHA TOSHIBA, Tokyo (JP)

(72) Inventors: Kenichiro Yamada, Tokyo (JP); Masayuki Takagishi, Tokyo (JP); Tomoyuki Maeda, Kanagawa (JP); Yousuke Isowaki, Kanagawa (JP); Shuichi Murakami, Tokyo (JP); Naoyuki Narita, Kanagawa (JP); Yasushi Tomizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/922,515

(22) Filed: Oct. 26, 2015

(65) Prior Publication Data

US 2016/0189746 A1    Jun. 30, 2016

(30) Foreign Application Priority Data

Dec. 26, 2014    (JP) .................................. 2014-264066

(51) Int. Cl.
  *G11B 5/31*    (2006.01)
  *G11B 20/12*    (2006.01)

(52) U.S. Cl.
  CPC .. *G11B 20/1217* (2013.01); *G11B 2020/1238* (2013.01)

(58) Field of Classification Search
  None
  See application file for complete search history.

(56) References Cited

U.S. PATENT DOCUMENTS

| 7,982,994 B1 | 7/2011 | Erden et al. |
| 8,134,802 B2 * | 3/2012 | Bai ...................... G11B 5/1278 360/125.3 |
| 8,472,139 B2 * | 6/2013 | Urakami .............. G11B 5/1278 360/119.02 |

(Continued)

FOREIGN PATENT DOCUMENTS

| JP | 2011-60412 | 3/2011 |
| JP | 2011-86321 | 4/2011 |
| JP | 2013-214353 | 10/2013 |

*Primary Examiner* — Will J Klimowicz
(74) *Attorney, Agent, or Firm* — Finnegan, Henderson, Farabow, Garrett & Dunner LLP

(57) ABSTRACT

According to one embodiment, a magnetic recording and reproducing device includes a magnetic recording medium and a magnetic head. The magnetic recording medium includes a first track including a first sub-track extending along a first direction, and a second sub-track extending along the first direction. The second sub-track is arranged with the first sub-track in a second direction intersecting the first direction. The magnetic head includes a recording unit and a reproducing unit. The recording unit records information in the magnetic recording medium. The reproducing unit reproduces the information recorded in the magnetic recording medium. The recording unit includes a magnetic pole, a write shield separated from the magnetic pole in the first direction, and a side shield separated from the magnetic pole in the second direction. The reproducing unit includes a reproducing element having a reproducing width along the second direction.

20 Claims, 7 Drawing Sheets

(56) References Cited

U.S. PATENT DOCUMENTS

| | | | |
|---|---|---|---|
| 8,896,965 B2* | 11/2014 | Guan | G11B 5/1278 360/119.04 |
| 8,976,484 B1* | 3/2015 | Akagi | G11B 5/012 360/97.12 |
| 8,988,814 B1 | 3/2015 | Harada et al. | |
| 8,988,825 B1* | 3/2015 | Zhang | G11B 5/3116 360/125.3 |
| 9,013,830 B2* | 4/2015 | Guan | G11B 5/1278 360/119.04 |
| 9,082,423 B1* | 7/2015 | Liu | G11B 5/11 |
| 9,431,039 B1* | 8/2016 | Li | G11B 5/3912 |
| 2011/0058277 A1 | 3/2011 | de la Fuente et al. | |
| 2011/0085266 A1 | 4/2011 | Kanai et al. | |
| 2013/0148228 A1* | 6/2013 | Albrecht | G11B 5/596 360/55 |
| 2014/0014617 A1* | 1/2014 | Guan | G11B 5/1278 216/22 |
| 2016/0133293 A1* | 5/2016 | Yamada | G11B 20/1217 360/48 |
| 2016/0275985 A1* | 9/2016 | Sugawara | G11B 20/1217 |

* cited by examiner

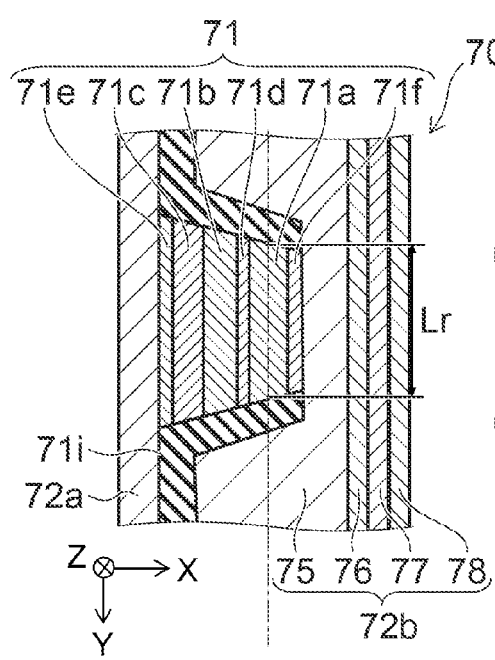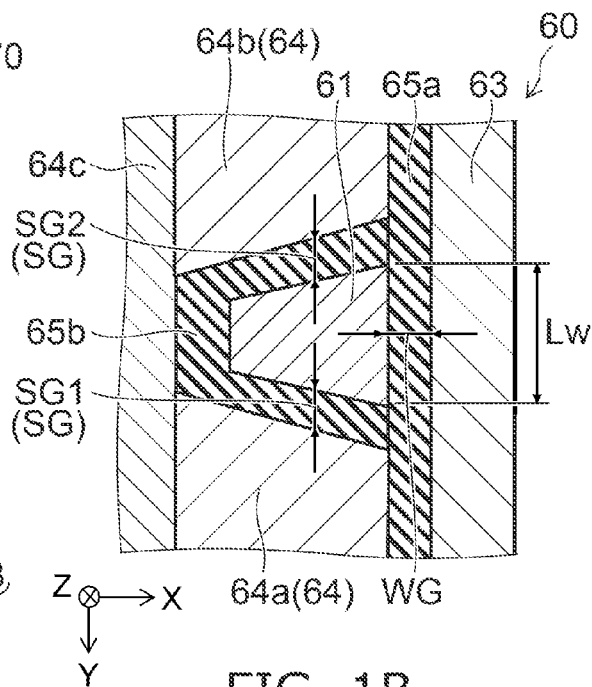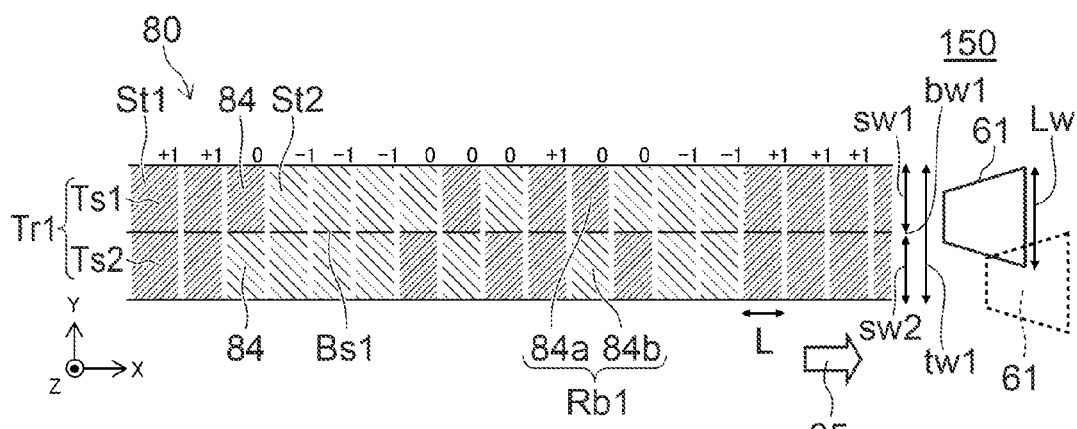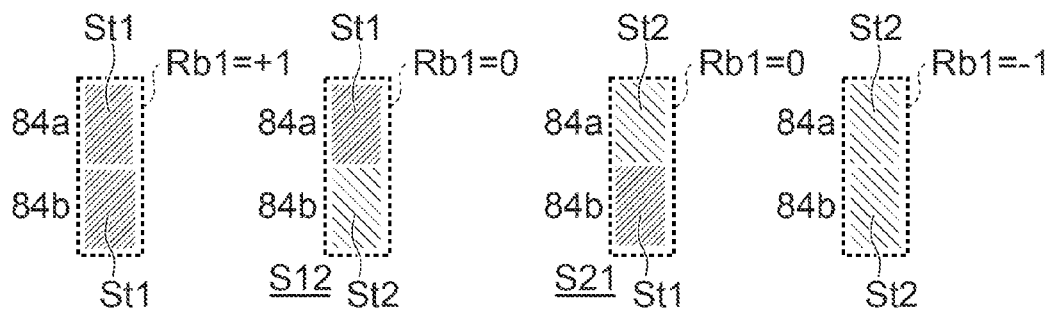
FIG. 1A  FIG. 1B  FIG. 1C  FIG. 1D  FIG. 1E  FIG. 1F  FIG. 1G

MAGNETIC RECORDING AND REPRODUCING DEVICE

CROSS-REFERENCE TO RELATED APPLICATIONS

This application is based upon and claims the benefit of priority from Japanese Patent Application No. 2014-264066, filed on Dec. 26, 2014; the entire contents of which are incorporated herein by reference.

FIELD

Embodiments described herein relate generally to a magnetic recording and reproducing device.

BACKGROUND

Information is recorded in a magnetic recording medium such as a HDD (Hard Disk Drive), etc., using a magnetic head. In a magnetic recording and reproducing device, it is desirable to implement high density recording more stably.

BRIEF DESCRIPTION OF THE DRAWINGS

FIG. 1A to FIG. 1G are schematic plan views showing a magnetic recording and reproducing device according to a first embodiment;

DETAILED DESCRIPTION

Figure 2A:
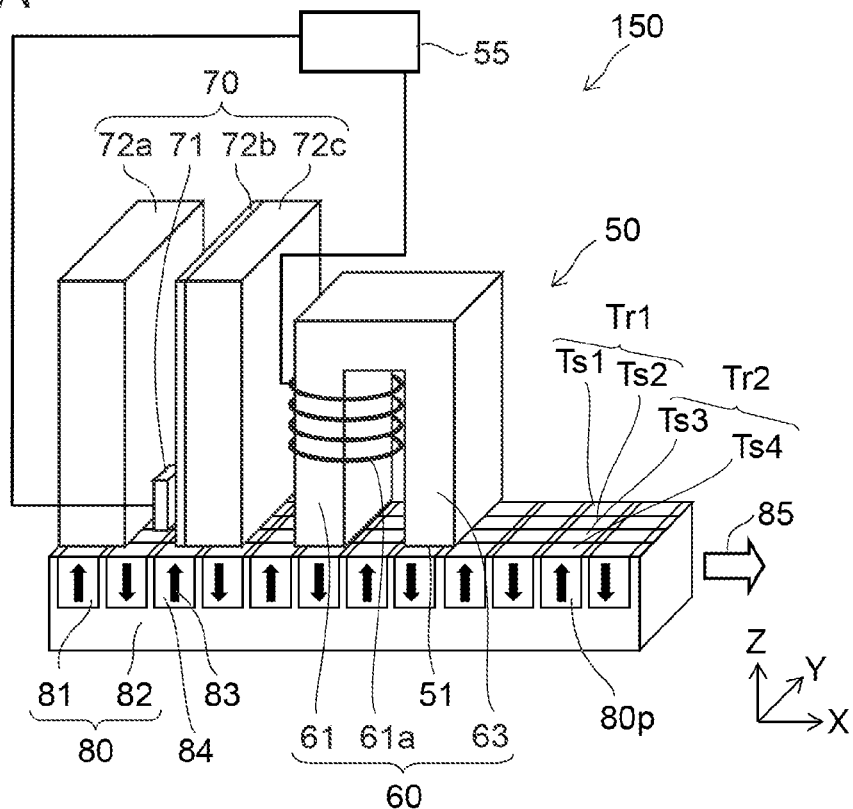
FIG. 2A and FIG. 2B are schematic views showing the magnetic recording and reproducing device according to the first embodiment.

According to one embodiment, a magnetic recording and reproducing device includes a magnetic recording medium and a magnetic head. The magnetic recording medium includes a first track including a first sub-track extending along a first direction, and a second sub-track extending along the first direction. The second sub-track is arranged with the first sub-track in a second direction intersecting the first direction. The magnetic head includes a recording unit and a reproducing unit. The recording unit records information in the magnetic recording medium. The reproducing unit reproduces the information recorded in the magnetic recording medium. The recording unit includes a magnetic pole, a write shield separated from the magnetic pole in the first direction, and a side shield separated from the magnetic pole in the second direction. The reproducing unit includes a reproducing element having a reproducing width along the second direction. The first track includes a plurality of first recording symbols. The first sub-track includes a plurality of first magnetic recording components. The second sub-track includes a plurality of second magnetic recording components. One of the first recording symbols is formed of one of the first magnetic recording components and one of the second magnetic recording components. The one of the first magnetic recording components has a first magnetization. The one of the second magnetic recording components has a second magnetization. The magnetic head sets the first magnetization and the second magnetization to a first state when information to be written to the one of the first recording symbols is a first value. The magnetic head sets the first magnetization and the second magnetization to a second state when the information to be written to the one of the first recording symbols is a second value. The magnetic head sets one of the first magnetization or the second magnetization to the first state and setting one other of the first magnetization or the second magnetization to the second state when the information to be written to the one of the first recording symbols is a third value. The reproducing width is not less than 1.2 times a side gap along the second direction between the magnetic pole and the side shield.

Various Embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1A to FIG. 1G are schematic plan views illustrating a magnetic recording and reproducing device according to a first embodiment.

Figure 2B:
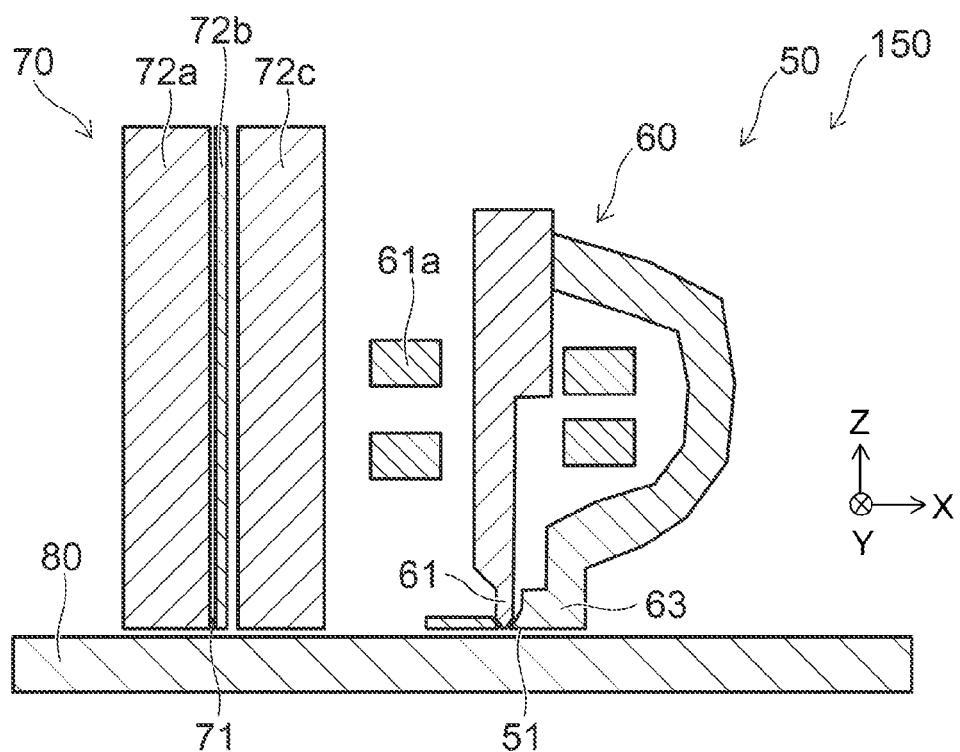

FIG. 2A and FIG. 2B are schematic views illustrating the magnetic recording and reproducing device according to the first embodiment.

FIG. 2A is a perspective view; and FIG. 2B is a cross-sectional view.

Figure 3:
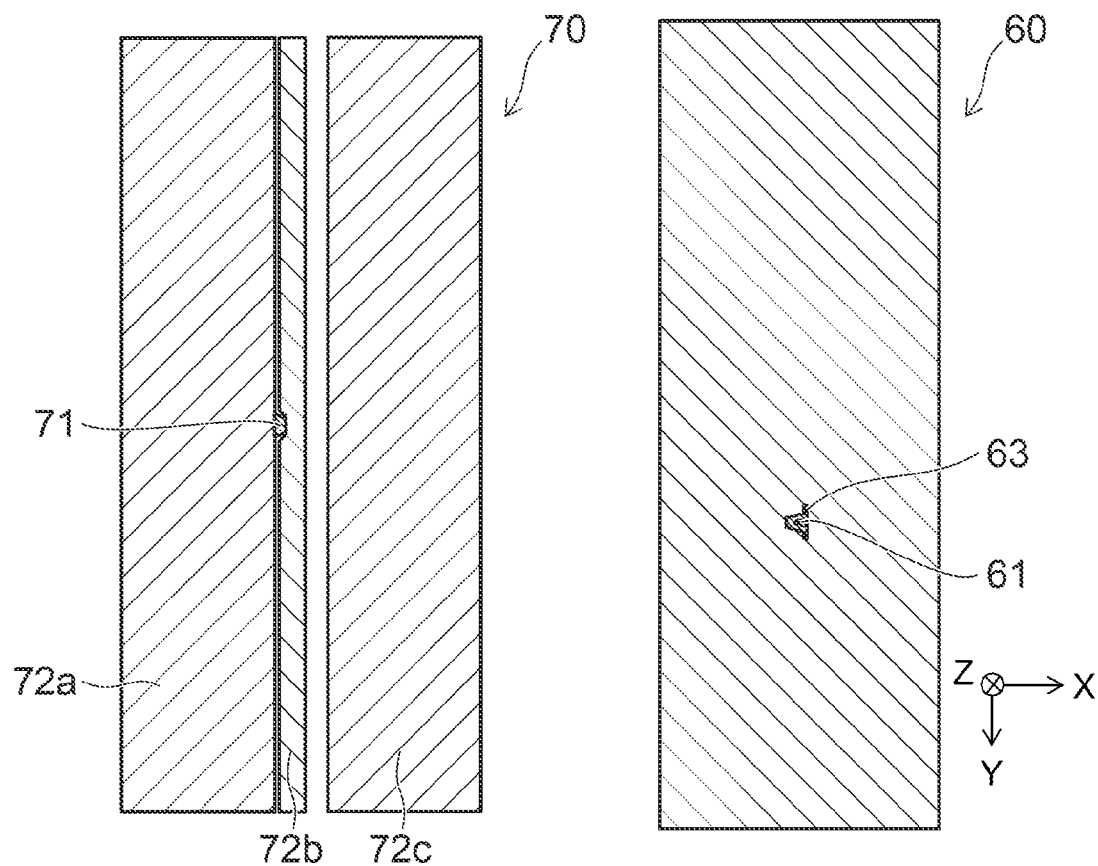
FIG. 3 is a schematic plan view showing the magnetic recording and reproducing device according to the first embodiment.

FIG. 3 is a schematic plan view illustrating the magnetic recording and reproducing device according to the first embodiment.

Figure 4:
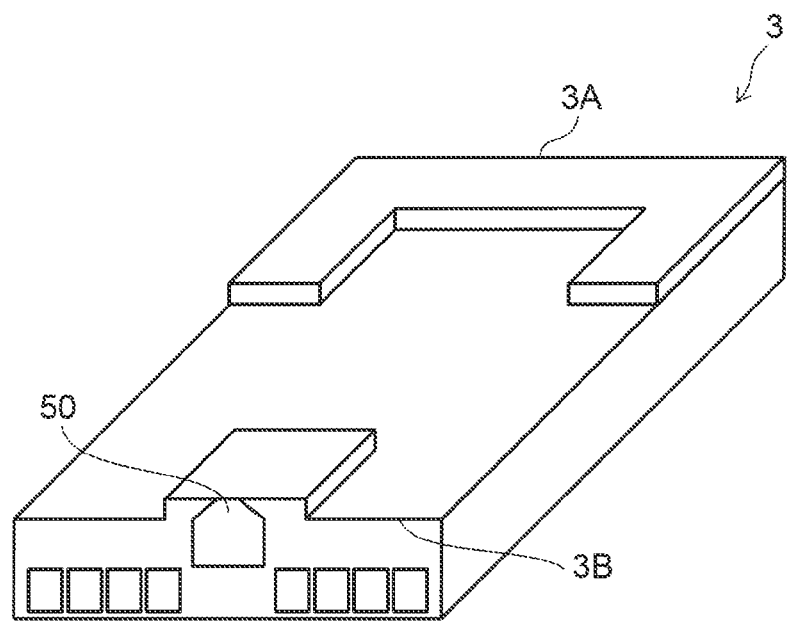
FIG. 4 is a schematic perspective view showing a portion of the magnetic recording and reproducing device according to the first embodiment.

FIG. 4 is a schematic perspective view illustrating a portion of the magnetic recording and reproducing device according to the first embodiment.

As shown in FIG. 2A and FIG. 2B, the magnetic recording and reproducing device 150 according to the embodiment includes a magnetic recording medium 80 and a magnetic head 50. The magnetic head 50 includes a recording unit 60 and a reproducing unit 70.

The magnetic head 50 is disposed to oppose the magnetic recording medium 80 (e.g., a magnetic disk, etc.). The magnetic head 50 has a medium-opposing surface 51 (Air Bearing Surface (ABS)). The medium-opposing surface 51 opposes the magnetic recording medium 80.

The magnetic recording medium 80 includes, for example, a medium substrate 82, and a magnetic recording layer 81 that is provided on the medium substrate 82.

Multiple magnetic recording components 84 are provided in the magnetic recording layer 81. The magnetic recording medium 80 moves relative to the magnetic head 50 along a medium movement direction 85.

A magnetization 83 (the direction of the magnetization 83) of each of the multiple magnetic recording components 84 is controlled by a magnetic field applied from the recording unit 60 of the magnetic head 50. The magnetization 83 that is controlled is used as information. Thereby, the recording operation of the information is implemented.

In the embodiment, the magnetic recording medium 80 is, for example, a perpendicular magnetic recording medium. For example, the magnetization 83 intersects the surface of the medium substrate 82. For example, the magnetization 83 is substantially perpendicular to the surface of the medium substrate 82. For example, the magnetization 83 has the two states of upward or downward. For example, the direction from the magnetic recording medium 80 toward the recording unit 60 is upward. For example, the direction from the recording unit 60 toward the magnetic recording medium 80 is downward.

In the example, the recording unit 60 includes a magnetic pole 61, a recording coil 61a, and a write shield 63. As described below, a side shield (not shown in FIGS. 2A and 2B) is further provided in the recording unit 60. A magnetic field (a recording magnetic field) is generated from the magnetic pole 61 by the recording coil 61a. The magnetization 83 of the magnetic recording component 84 is controlled by the recording magnetic field. By providing the write shield 63, the strength of the recording magnetic field is increased; and the controllability is improved.

On the other hand, the information (the magnetization 83) that is recorded in the multiple magnetic recording components 84 is reproduced by the reproducing unit 70. Thereby, the reproduction operation is implemented.

In the example, the reproducing unit 70 includes a reproducing element 71, a first reproducing shield 72a, a second reproducing shield 72b, and a third reproducing shield 72c. The second reproducing shield 72b is disposed between the first reproducing shield 72a and the third reproducing shield 72c. The reproducing element 71 is disposed between the first reproducing shield 72a and the second reproducing shield 72b. The reproducing element 71 includes, for example, an element having a magnetoresistance effect, etc.

For example, the direction connecting the write shield 63 and the magnetic pole 61 is aligned with the medium movement direction 85.

A designated portion 80p of the magnetic recording medium 80 opposes the write shield 63 after opposing the magnetic pole 61.

The direction from the magnetic recording medium 80 toward the magnetic head 50 is taken as a Z-axis direction. One direction orthogonal to the Z-axis direction is taken as an X-axis direction. A direction orthogonal to the Z-axis direction and the X-axis direction is taken as a Y-axis direction.

The magnetic recording medium 80 includes multiple tracks (e.g., a first track Tr1, a second track Tr2, etc.). Each of the multiple tracks includes the multiple magnetic recording components 84. The multiple magnetic recording components 84 that are included in each of the multiple tracks are arranged along a down-track direction. The multiple tracks are arranged along a track width direction.

For example, the down-track direction is aligned with the X-axis direction. The down-track direction is parallel to the medium-opposing surface 51. The down-track direction is aligned with the direction from the magnetic pole 61 toward the write shield 63.

The track width direction is aligned with the Y-axis direction. The track width direction is parallel to the medium-opposing surface 51. The track width direction is perpendicular to the direction from the magnetic pole 61 toward the write shield 63.

As shown in FIG. 3, the position in the Y-axis direction of the reproducing unit 70 may be different from the position in the Y-axis direction of the recording unit 60.

In the embodiment as shown in FIG. 2A, each of the multiple tracks includes multiple sub-tracks. For example, the first track Tr1 includes a first sub-track Ts1 and a second sub-track Ts2. The second track Tr2 includes a third sub-track Ts3 and a fourth sub-track Ts4. Examples of the sub-tracks are described below.

A controller 55 is further provided in the magnetic recording and reproducing device 150. The controller 55 controls the operations of the recording unit 60. For example, the controller 55 acquires the information recorded in the magnetic recording medium 80 and generates the information relating to the state of each of the magnetic recording components 84 of the tracks provided in the magnetic recording medium 80. The controller 55 controls the operations of the recording unit 60 based on the generated information. The controller 55 may control the reproducing unit 70. The controller 55 may process the information reproduced by the reproducing unit 70.

FIG. 4 illustrates a head slider to which the magnetic head 50 is mounted.

The magnetic head 50 is mounted to the head slider 3. The head slider 3 includes, for example, $Al_2O_3$/TiC, etc. The head slider 3 moves relative to the magnetic recording medium 80 while flying over or contacting the magnetic recording medium 80.

The head slider 3 has, for example, an air inflow side 3A and an air outflow side 3B. The magnetic head 50 is disposed at the side surface of the air outflow side 3B of the head slider 3 or the like. Thereby, the magnetic head 50 that is mounted to the head slider 3 moves relative to the magnetic recording medium 80 while flying over or contacting the magnetic recording medium 80.

The magnetic head 50 according to the embodiment may record the information in the magnetic recording medium 80 by shingled magnetic recording (SMR) described below.

FIG. 1A is a plan view illustrating the reproducing unit 70 provided in the magnetic head 50. FIG. 1B is a plan view illustrating the recording unit 60 provided in the magnetic head 50. FIG. 1A and FIG. 1B are plan views as viewed from the medium-opposing surface 51. FIG. 1C is a plan view illustrating the first track Tr1 of the magnetic recording medium 80. FIG. 1D to FIG. 1G are plan views illustrating the four states of the recording symbol of the magnetic recording medium 80.

The third reproducing shield 72c is not shown in FIG. 1A. As shown in FIG. 1A, the reproducing element 71 is provided in the reproducing unit 70 between the first reproducing shield 72a and the second reproducing shield 72b. In the example, the second reproducing shield 72b includes a first shield film 75, a second shield film 76, a third shield film 77, and a fourth shield film 78. The first shield film 75 is provided between the fourth shield film 78 and the first reproducing shield 72a. The second shield film 76 is provided between the first shield film 75 and the fourth shield film 78. The third shield film 77 is provided between the second shield film 76 and the fourth shield film 78. The first shield film 75 includes, for example, NiFe. The second shield film 76 includes, for example, Ru. The third shield film 77 includes, for example, NiFe. The fourth shield film 78 includes, for example, IrMn. The first reproducing shield 72a includes, for example, NiFe. The third reproducing shield 72c includes, for example, NiFe, an FeCoNi alloy, etc.

An insulating layer 71i is provided in the region between the first reproducing shield 72a and the second reproducing shield 72b where the reproducing element 71 is not provided.

The reproducing element 71 includes, for example, a first electrode 71e, a second electrode 71f, a first magnetic layer 71a, a second magnetic layer 71b, a third magnetic layer 71c, and an intermediate layer 71d. The first electrode 71e is provided between the first reproducing shield 72a and the second reproducing shield 72b. The second electrode 71f is provided between the first electrode 71e and the second reproducing shield 72b. The first magnetic layer 71a is provided between the first electrode 71e and the second electrode 71f. The second magnetic layer 71b is provided between the first electrode 71e and the first magnetic layer 71a. The third magnetic layer 71c is provided between the first electrode 71e and the second magnetic layer 71b. The intermediate layer 71d is provided between the first magnetic layer 71a and the second magnetic layer 71b. The first magnetic layer 71a is, for example, a free magnetic layer. The third magnetic layer 71c is an antiferromagnetic layer. The second magnetic layer 71b is a fixed magnetic layer. In the embodiment, the second magnetic layer 71b may be a free magnetic layer.

The reproducing element 71 has a reproducing width Lr. The reproducing width Lr is the width in a second direction (the Y-axis direction) of the first magnetic layer 71a. There are cases where the side surface of the first magnetic layer 71a is tilted with respect to the X-axis direction. Thus, in the case where the side surface of the first magnetic layer 71a has a tapered configuration, the reproducing width Lr is taken as the width in the Y-axis direction of the first magnetic layer 71a at the position of the center of the first magnetic layer 71a in the X-axis direction.

As shown in FIG. 1B, the recording unit 60 includes the magnetic pole 61, the write shield 63, and a side shield 64. In the example, the side shield 64 includes a first side shield 64a and a second side shield 64b.

The write shield 63 is separated from the magnetic pole 61 in a first direction (e.g., the X-axis direction). The side shield 64 is separated from the magnetic pole 61 in the second direction (the Y-axis direction). The first side shield 64a is separated from the magnetic pole 61 in the second direction. The second side shield 64b is separated from the magnetic pole 61 in the second direction. The magnetic pole 61 is disposed between the first side shield 64a and the second side shield 64b. For example, the position in the X-axis direction of the magnetic pole 61 is disposed between the position in the X-axis direction of the write shield 63 and the position in the X-axis direction of the reproducing unit 70.

In the example, the recording unit 60 further includes a return shield 64c. The magnetic pole 61, the first side shield 64a, and the second side shield 64b are disposed between the return shield 64c and the write shield 63.

A first insulating layer 65a is provided between the magnetic pole 61 and the write shield 63. A second insulating layer 65b is provided at the position between the magnetic pole 61 and the first side shield 64a, the position between the magnetic pole 61 and the second side shield 64b, and the position between the magnetic pole 61 and the return shield 64c. The insulating layers include, for example, aluminum oxide, etc.

The recording unit 60 of the magnetic head 50 has a write gap WG. The write gap WG is the spacing along the first direction (the X-axis direction) between the magnetic pole 61 and the write shield 63.

A side gap SG is the spacing along the second direction (the Y-axis direction) between the magnetic pole 61 and the side shield 64. A first side gap SG1 is the spacing along the second direction (the Y-axis direction) between the magnetic pole 61 and the first side shield 64a. A second side gap SG2 is the spacing along the second direction (the Y-axis direction) between the magnetic pole 61 and the second side shield 64b. The side gap SG is one of the first side gap SG1 or the second side gap SG2. For example, the first side gap SG1 is substantially the same as the second side gap SG2. For example, the first side gap SG1 may be not less than 0.8 times and not more than 1.2 times the second side gap SG2. In the embodiment, the first side gap SG1 may be different from the second side gap SG2. The average of the first side gap SG1 and the second side gap SG2 may be used as the side gap SG.

A magnetic pole width Lw is the width in the Y-axis direction (the second direction) of the magnetic pole 61. The magnetic pole width Lw is the maximum value of the length along the second direction (the Y-axis direction) of the magnetic pole 61 in the medium-opposing surface 51.

As shown in FIG. 1C, the magnetic recording medium 80 includes the first track Tr1. The first track Tr1 extends in the first direction (the X-axis direction). The first track Tr1 includes multiple first recording symbols Rb1. The multiple first recording symbols Rb1 are arranged in the first direction (the X-axis direction). The positions of the multiple first recording symbols Rb1 are different from each other in the first direction.

The first track Tr1 includes the first sub-track Ts1 and the second sub-track Ts2. The first sub-track Ts1 and the second sub-track Ts2 extend in the X-axis direction.

The first sub-track Ts1 includes the multiple magnetic recording components 84 (multiple first magnetic recording components 84a). For example, the multiple first magnetic recording components 84a are arranged along the first direction (the X-axis direction). For example, the positions of the multiple first magnetic recording components 84a are different from each other in the first direction.

The second sub-track Ts2 is arranged with the first sub-track Ts1 in the second direction (the Y-axis direction). The second direction intersects the first direction. The second sub-track Ts2 includes the multiple magnetic recording components 84 (multiple second magnetic recording components 84b). For example, the multiple second magnetic recording components 84b are arranged along the first direction. For example, the positions of the multiple second magnetic recording components 84b are different from each other in the first direction.

For example, one of the multiple second magnetic recording components 84b is arranged in the second direction (the Y-axis direction) with one of the multiple first magnetic recording components 84a.

The one of the multiple first recording symbols Rb1 is formed of one of the multiple first magnetic recording components 84a and one of the multiple second magnetic recording components 84b. A length L in the first direction (the X-axis direction) of the one of the multiple first recording symbols Rb1 is, for example, not less than 5 nanometers and not more than 20 nanometers. The length L corresponds to the length in the first direction of the one of the multiple first magnetic recording components 84a. The length L corresponds to the length in the first direction of the one of the multiple second magnetic recording components 84b.

The one of the multiple first magnetic recording components 84a has a first magnetization. The one of the multiple second magnetic recording components 84b has a second magnetization.

The state of one first recording symbol Rb1 is determined by the combination of the state (the first magnetization) of the magnetization 83 of the multiple first magnetic recording components 84a and the state (the second magnetization) of the magnetization 83 of the multiple second magnetic recording components 84b. In the example, one first recording symbol Rb1 has three mutually-different states (values).

Namely, as illustrated in FIG. 1D, the first recording symbol Rb1 is a first value when the first magnetization of the first magnetic recording component 84a is in a first state St1 and the second magnetization of the second magnetic recording component 84b is in the first state St1. The first value is, for example, "+1."

As illustrated in FIG. 1G, the first recording symbol Rb1 is a second value when the first magnetization of the first magnetic recording component 84a is in a second state St2 and the second magnetization of the second magnetic recording component 84b is in the second state St2. The second value is, for example, "−1."

As illustrated in FIG. 1E, the first recording symbol Rb1 is a third value when the first magnetization of the first magnetic recording component 84a is in the first state St1 and the second magnetization of the second magnetic recording component 84b is in the second state St2. The third value is, for example, "0." The third value of this state is called a state S12.

As illustrated in FIG. 1F, the first recording symbol Rb1 is the third value when the first magnetization of the first magnetic recording component 84a is in the second state St2 and the second magnetization of the second magnetic recording component 84b is in the first state St1. The third value is, for example, "0." The third value of this state is called a state S21.

The control of the magnetizations is performed by the magnetic head 50 (the recording unit 60).

In other words, the magnetic head 50 (the recording unit 60) sets the first magnetization and the second magnetization to the first state St1 when the information to be written to the one of the multiple first recording symbols Rb1 is the first value. The magnetic head 50 (the recording unit 60) sets the first magnetization and the second magnetization to the second state St2 when the information to be written to the one of the multiple first recording symbols Rb1 is the second value. The magnetic head 50 (the recording unit 60) sets one of the first magnetization or the second magnetization to the first state St1 and sets the other of the first magnetization or the second magnetization to the second state St2 when the information to be written to the one of the multiple first recording symbols Rb1 is the third value.

Thus, in the embodiment, ternary information is recorded in the magnetic recording medium 80.

For example, in the case where the magnetic recording medium 80 is a perpendicular magnetic recording medium, the first state St1 is one of upward or downward. For example, the second state St2 is the other of upward or downward.

For example, the direction of the first magnetization in the first state St1 and the direction of the second magnetization in the first state St1 intersect a plane (e.g., the X-Y plane) including the first direction and the second direction. The direction of the first magnetization in the second state St2 and the direction of the second magnetization in the second state St2 intersect the plane (e.g., the X-Y plane) including the first direction and the second direction. The direction of the first magnetization in the second state St2 is the reverse of the direction of the first magnetization in the first state St1. The direction of the second magnetization in the second state St2 is the reverse of the direction of the second magnetization in the first state St1.

By performing the ternary recording, the information (the first to third values of +1, −1, and 0) illustrated in FIG. 1C is provided in the magnetic recording medium 80 (the first track Tr1)

As illustrated in FIG. 1C, a first track width tw1 is the length in the second direction (the Y-axis direction) of the first track Tr1. The first track width tw1 substantially corresponds to the total of the widths of the two sub-tracks. In other words, including the error of the measurement, the sum of a first sub-track width sw1 in the second direction of the first sub-track Ts1 and a second sub-track width sw2 in the second direction of the second sub-track Ts2 is not less than 0.98 times and not more than 1.02 times the first track width tw1 of the first track Tr1. For example, each of the first sub-track width sw1 and the second sub-track width sw2 is substantially ½ of the first track width tw1.

The first track Tr1 has an aspect ratio AR. The aspect ratio AR is the ratio of the first track width tw1 to the length in the first direction (the X-axis direction) of one of the multiple first magnetic recording components 84a. The length in the first direction (the X-axis direction) of the one of the multiple first magnetic recording components 84a corresponds to the length L in the first direction (the X-axis direction) of one of the multiple first recording symbols Rb1. For example, the sum of the length in the second direction (the Y-axis direction) of the one of the multiple first magnetic recording components 84a and the length in the second direction of one of the multiple second magnetic recording components substantially corresponds to the first track width tw1.

In other words, a width bw1 in the second direction of a boundary Bs1 between the first sub-track Ts1 and the second sub-track Ts2 is extremely small. Including the error of the measurement, the width bw1 is, for example, not more than 0.02 times the first sub-track width sw1 and not more than 0.02 times the second sub-track width sw2. For example, the first sub-track Ts1 substantially contacts the second sub-track Ts2.

The recording unit 60 (the magnetic pole 61) may record the information in the first sub-track Ts1 and the second sub-track Ts2 by shingled magnetic recording (SMR).

For example, as illustrated in FIG. 1C, when recording the information in the first sub-track Ts1 (the control of the first magnetization), the magnetic recording medium 80 is moved relative to the magnetic pole 61 along the X-axis direction (corresponding to the medium movement direction 85) at the position of the magnetic pole 61 displayed by the solid line. Then, when recording the information in the second sub-track Ts2 (the control of the second magnetization), the magnetic recording medium 80 is moved relative to the magnetic pole 61 along the X-axis direction at the position of the magnetic pole 61 displayed by the broken line.

The magnetic pole width Lw is greater than the length in the second direction of the one of the multiple first magnetic recording components 84a. The magnetic pole width Lw is greater than the length in the second direction of the one of the multiple second magnetic recording components 84b. As illustrated in FIG. 1C, the magnetic pole width Lw is the maximum value of the length along the second direction (the Y-axis direction) of the magnetic pole 61 in the medium-opposing surface 51.

For example, the magnetic pole width Lw is not less than 1 times and not more than 4 times the length (corresponding to the first sub-track width sw1) in the second direction of the one of the multiple first magnetic recording components 84. The magnetic pole width Lw is not less than 1 times and not more than 4 times the length (corresponding to the second sub-track width sw2) in the second direction of the one of the multiple second magnetic recording components 84b.

The density of the information in the magnetic recording medium 80 is increased by recording the information by shingled magnetic recording.

On the other hand, the information that is recorded in the first track Tr1 of the magnetic recording medium 80 is reproduced by the reproducing unit 70 (the reproducing element 71). The reproducing unit 70 (the reproducing element 71) reproduces the recorded information by, for example, sensing, along the first direction (the X-axis direction), the values corresponding to the first magnetization and the second magnetization while opposing the first sub-track Ts1, the second sub-track Ts2, and the boundary Bs1 between the first sub-track Ts1 and the second sub-track Ts2.

The reproducing width Lr of the reproducing element 71 is not less than 0.4 times and not more than 1 times the first track width tw1 (the length in the second direction (the Y-axis direction) of the first track Tr1). Thereby, the magnetization of the first sub-track Ts1 and the magnetization of the second sub-track Ts2 can be sensed stably.

Thus, in the embodiment, one track includes two sub-tracks. Three values are determined according to the states of the magnetic recording components 84 included in each of the two sub-tracks.

According to investigations of the inventor of the application, it was found that there are cases where the information to be recorded may be erroneously recorded when the control of the magnetization at the second-direction end portions of each of the two sub-tracks is insufficient. It was found that the recorded information is easily reproduced erroneously when the control of the magnetization at the second-direction end portions of each of the two sub-tracks is insufficient.

In other words, in the embodiment, the third value is determined by both the state of the first magnetic recording component 84a and the state of the second magnetic recording component 84b. If the control of the magnetization at the second-direction end portions of the first magnetic recording component 84a is insufficient and the control of the magnetization at the second-direction end portions of the second magnetic recording component 84b is insufficient, for example, the width in the second direction of the first magnetic recording component 84a becomes greater than the setting value; and the width in the second direction of the second magnetic recording component 84b becomes less than the setting value. In such a case, if the first magnetic recording component 84a is in the first state St1 and the second magnetic recording component 84b is in the second state St2, the first state St1 becomes predominant; and there are cases where the reproduced information is recognized as the first value. Thus, the value is erroneously reproduced as the first value for the state in which the third value should be reproduced.

Such a phenomenon is unique to the configuration that records/reproduces ternary values using two sub-tracks. For example, such a problem does not occur in a reference example in which sub-tracks are not provided.

For example, a sneak magnetic field is generated for the third value in which the first magnetic recording component 84a is in the first state St1 and the second magnetic recording component 84b is in the second state St2. The sneak magnetic field has a component in the second direction (the Y-axis direction). There are also cases where the sneak magnetic field affects the characteristics of the reproducing element 71. For example, the level of the sneak magnetic field is dependent on the position (the position in the second direction) of the boundary Bs1 between the first magnetic recording component 84a and the second magnetic recording component 84b. For example, the effect of the sneak magnetic field on the reproducing element 71 can be caused to be substantially constant by increasing the precision of the position along the second direction of the boundary Bs1 between the first magnetic recording component 84a and the second magnetic recording component 84b. Thereby, the reproduction characteristics can be stabilized. For example, by causing the effect of the sneak magnetic field on the reproducing element 71 to be constant, the correction of the sense output of the reproducing element 71 is easy; and as a result, reproduction errors can be suppressed.

The sneak magnetic field due to the first magnetic recording component 84a and the second magnetic recording component 84b also is unique to the configuration that records/reproduces ternary values using two sub-tracks. For example, the problem of such a sneak magnetic field does not occur in a reference example in which sub-tracks are not provided.

For example, the state of the magnetization at the second-direction end portions of the first sub-track Ts1 of the first track Tr1 is affected by the configuration of the recording unit 60 (e.g., the side gap SG of the recording unit 60, etc.).

According to investigations of the inventor of the application, it was found that the controllability of the magnetization at the second-direction end portions of the sub-track can be increased by appropriately setting the side gap SG of the recording unit 60 of the magnetic head 50.

As recited above, the third value is determined by both the state of the first magnetic recording component 84a and the state of the second magnetic recording component 84b. The reproducing width Lr of the reproducing element 71 sensing these states is determined according to the first track width tw1. It is considered that stable magnetic recording can be implemented by setting the width of the region where the magnetization is unstable at the boundary Bs1 between the first magnetic recording component 84a and the second magnetic recording component 84b to be small with respect to the reproducing width Lr. The inventor of the application focused on the relationship between the reproducing width Lr of the reproducing element 71 and the side gap SG of the recording unit 60.

For example, the relationship between the reproducing width Lr and the side gap SG (at least one of the first side gap SG1 or the second side gap SG2) of the recording unit 60 of the magnetic head 50 is set to a prescribed relationship.

In the embodiment, the reproducing width Lr is set to be not less than 1.2 times the side gap SG along the second direction between the magnetic pole 61 and the side shield 64. It is favorable for the reproducing width Lr to be not less than 1.7 times the side gap SG along the second direction between the magnetic pole 61 and the side shield 64. In other words, the side gap SG is set to be not more than 0.83 times the reproducing width Lr. It is favorable for the side gap SG to be not more than 0.59 times the reproducing width Lr.

Such conditions are based on the following results of simulations implemented by the inventor of the application. In the simulations, the reproduction noise is determined for different side gaps SG. In the simulation, the pattern in which the state S12 and the state S21 are repeated alternately (each being the third value) illustrated in FIG. 1E and FIG. 1F is written to the magnetic recording medium 80. Then, the reproduction noise (the third value reproduction noise) when the pattern is reproduced by the reproducing element 71 is determined.

The third value reproduction noise is a relative value in which the noise of the reference signal is set to 1. The reference signal is the reproduction signal when the first value and the second value are written alternately to the magnetic recording medium 80. In the reference signal, the first sub-track Ts1 and the second sub-track Ts2 are in the same state. Accordingly, in the reference signal, there is no effect of the magnetization being different between the first sub-track Ts1 and the second sub-track Ts2 at the boundary Bs1 between the first sub-track Ts1 and the second sub-track Ts2. Accordingly, the noise that is included in the reference signal is the noise component occurring when the first state St1 and the second state St2 are interchanged alternately in the down-track direction (the X-axis direction). On the other hand, for the pattern in which the state S12 and the state S21 are repeated alternately (each being the third value), noise due to the first state a1 and the second state St2 interchanging alternately in the Y-axis direction between the first sub-track Ts1 and the second sub-track Ts2 is included in addition to the noise component that occurs when the first state St1 and the second state St2 are interchanged alternately in the down-track direction (the X-axis direction). Accordingly, the third value reproduction noise corresponds to the ratio of the noise due to the first state a1 and the second state St2 interchanging alternately in the Y-axis direction to the noise occurring when the first state St1 and the second state St2 interchange alternately in the X-axis direction.

Figure 5A:
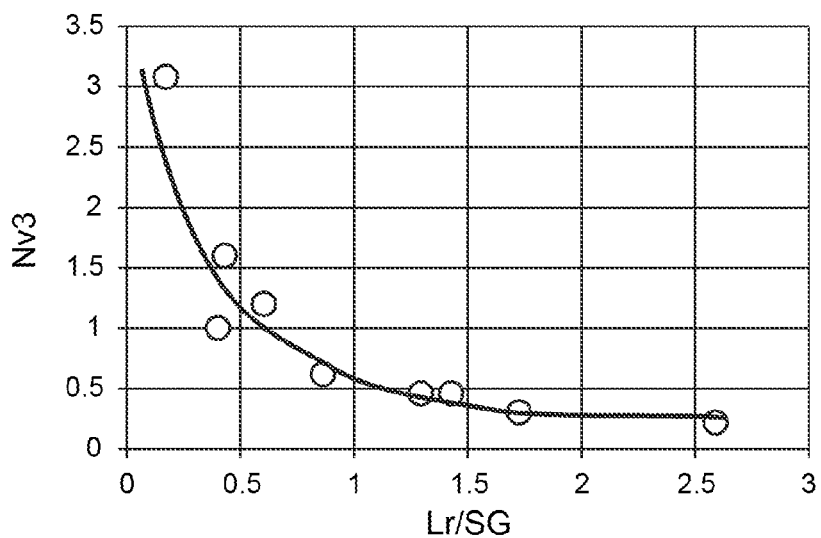
FIG. 5A to FIG. 5C are graphs of characteristics of the magnetic recording and reproducing device.
Figure 5B:
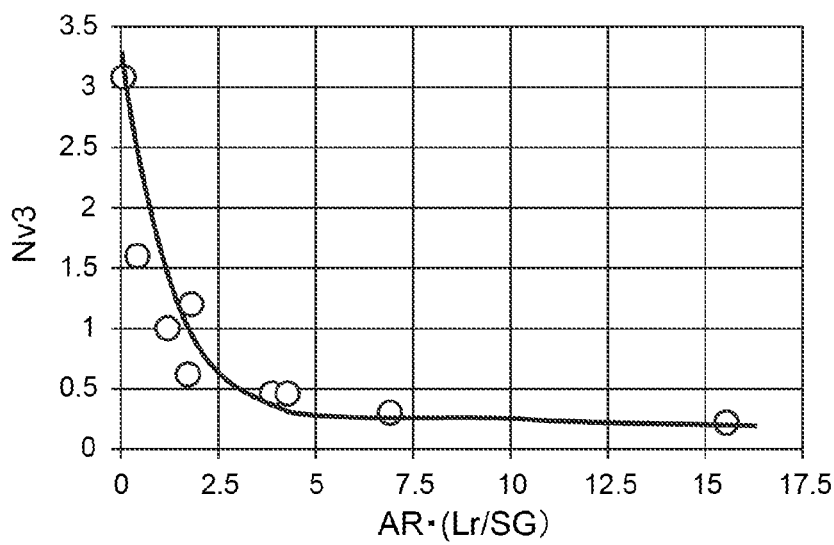
Figure 5C:
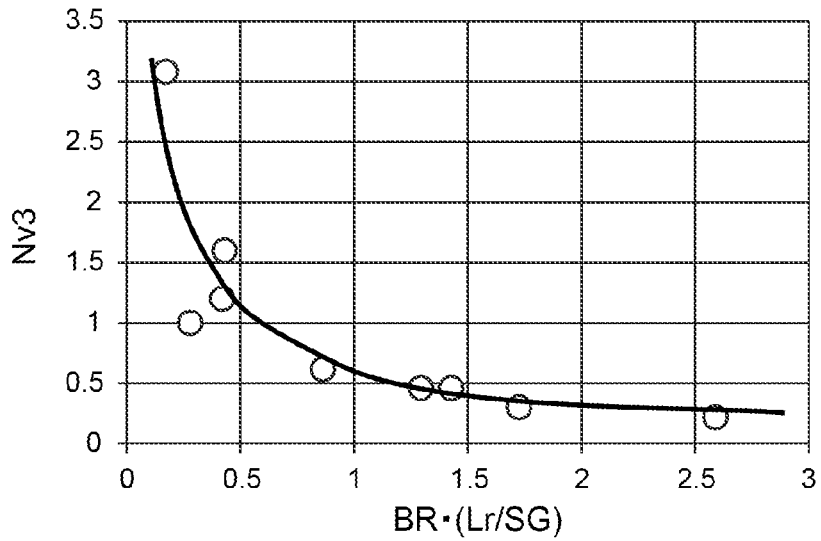

FIG. 5A to FIG. 5C are graphs of characteristics of the magnetic recording and reproducing device.

These drawings illustrate the simulation results. The horizontal axis of FIG. 5A is a ratio (Lr/SG) of the reproducing width Lr to the side gap SG. The vertical axis is third value reproduction noise Nv3. When the third value reproduction noise Nv3 is 1, the reproduction noise of the pattern in which the state S12 and the state S21 are repeated alternately is the same as the reproduction noise of the reference signal. For stable magnetic recording and reproducing, it is desirable for the third value reproduction noise Nv3 to be small.

The example of FIG. 5A is the characteristic when the reproducing width Lr is set to be constant at 36 nm and the side gap SG is changed. In the example, the first track width tw1 (the length in the second direction (the Y-axis direction) of the first track Tr1) is 50 nm.

It can be seen from FIG. 5A that the third value reproduction noise Nv3 decreases as the ratio Lr/SG of the reproducing width Lr to the side gap SG increases. The third value reproduction noise Nv3 is 0.5 or less when the ratio Lr/SG is 1.2 or more. The third value reproduction noise Nv3 is even lower when the ratio Lr/SG is 1.4 or more. The third value reproduction noise Nv3 is stable and low when the ratio Lr/SG is 1.7 or more.

Therefore, it is favorable for the ratio Lr/SG to be 1.2 or more. It is more favorable for the ratio Lr/SG to be 1.4 or more. It is even more favorable for the ratio Lr/SG to be 1.7 or more. In other words, it is favorable for the reproducing width Lr to be not less than 1.2 times the side gap SG. It is more favorable for the reproducing width Lr to be not less than 1.4 times the side gap SG. It is even more favorable for the reproducing width Lr to be not less than 1.7 times the side gap SG.

It is considered that the size of the side gap SG affects the width of the region including the boundary Bs1 between the first magnetic recording component 84a and the second magnetic recording component 84b (the region where the magnetization is unstable). In the case where the side gap SG is large, the width of the region where the magnetization is unstable is large. On the other hand, in the case where the reproducing width Lr is small, the width of the region where the magnetization of the first magnetic recording component 84a is sensed and the width of the region where the magnetization of the second magnetic recording component 84 is sensed are small. Accordingly, in the case where the reproducing width Lr is small, the relative size of the width of the region where the magnetizations of the first magnetic recording component 84a and the second magnetic recording component 84 are sensed is small with respect to the width of the region including the boundary Bs1 (the region where the magnetization is unstable). Accordingly, it is considered that setting the ratio of the reproducing width Lr to the side gap SG to be high is effective for reducing the third value reproduction noise Nv3. In other words, the third value reproduction noise Nv3 can be reduced by setting the ratio of the side gap SG to the reproducing width Lr to be low.

In the embodiment, the ratio Lr/SG is set to be 1.2 or more. Thereby, a magnetic recording and reproducing device in which stable magnetic recording and reproducing are possible can be provided.

FIG. 5B shows the relationship between the third value reproduction noise Nv3 and the aspect ratio AR and ratio Lr/SG of the first track Tr1 of the magnetic recording medium 80. The aspect ratio AR is the ratio of the first track width tw1 to the length L in the X-axis direction of the first magnetic recording component 84a. The horizontal axis of FIG. 5B is the product of the aspect ratio AR and the ratio Lr/SG (AR·(Lr/SG)). The vertical axis of FIG. 5B is the third value reproduction noise Nv3.

The example of FIG. 5B is the characteristic when the reproducing width Lr is set to be constant at 30 nm, the aspect ratio AR is changed in the range of 0.4 to 10, and the side gap SG is changed.

It can be seen from FIG. 5B that the third value reproduction noise Nv3 decreases as the value AR·(Lr/SG) increases. The third value reproduction noise Nv3 is 0.5 or less when the value AR·(Lr/SG) is 3 or more. The third value reproduction noise Nv3 is even lower when the value AR·(Lr/SG) is 4 or more. The third value reproduction noise Nv3 is stable and low when the value AR·(Lr/SG) is 7 or more.

Therefore, it is favorable for the value AR·(Lr/SG) to be 3 or more. It is more favorable for the value AR·(Lr/SG) to be 4 or more. It is even more favorable for the value AR·(Lr/SG) to be 7 or more. In other words, it is favorable for the product of the aspect ratio AR and the reproducing width Lr to be not less than 3 times the side gap SG. It is more favorable for the product of the aspect ratio AR and the reproducing width Lr to be not less than 4 times the side gap SG. It is even more favorable for the product of the aspect ratio AR and the reproducing width Lr to be not less than 7 times the side gap SG.

FIG. 5C shows the relationship between the third value reproduction noise Nv3 and the ratio Lr/SG and the saturation magnetization of the write shield 63 and the side shield 64. A saturation magnetization ratio BR is the ratio ($Bs_{64}$/$Bs_{63}$) of the saturation magnetization ($Bs_{64}$) of the side shield 64 to the saturation magnetization ($Bs_{63}$) of the write shield 63. The horizontal axis of FIG. 5C is the product (BR·(Lr/SG)) of the saturation magnetization ratio BR and the ratio Lr/SG. The vertical axis of FIG. 5B is the third value reproduction noise Nv3.

The example of FIG. 5C is the characteristic when the reproducing width Lr is set to be constant at 30 nm, a saturation magnetization Bs63 of the write shield 63 is set to be constant at 2.3 T, a saturation magnetization Bs64 of the side shield 64 is changed in the range of 1.6 T to 2.3 T, and the side gap SG is changed.

It can be seen from FIG. 5C that the third value reproduction noise Nv3 decreases as the value BR·(Lr/SG) increases. The third value reproduction noise Nv3 is 0.5 or less when the value BR·(Lr/SG) is 1.2 or more. The third value reproduction noise Nv3 is even lower when the value BR·(Lr/SG) is 1.4 or more. The third value reproduction noise Nv3 is stable and low when the value BR·(Lr/SG) is 1.7 or more.

Therefore, it is favorable for the value BR·(Lr/SG) to be 1.2 or more. It is more favorable for the value BR·(Lr/SG) to be 1.4 or more. It is even more favorable for the value BR·(Lr/SG) to be 1.7 or more. In other words, it is favorable for the product of the saturation magnetization ratio BR and the reproducing width Lr to be not less than 1.2 times the side gap SG. It is more favorable for the product of the saturation magnetization ratio BR and the reproducing width Lr to be not less than 1.4 times the side gap SG. It is even more favorable for the product of the saturation magnetization ratio BR and the reproducing width Lr to be not less than 1.7 times the side gap SG.

It is considered that the size of the side gap SG affects the width of the region including the boundary Bs1 between the first magnetic recording component 84a and the second magnetic recording component 84b (the region where the magnetization is unstable). In the case where the side gap SG is large, the width of the region where the magnetization is unstable becomes large. It is also considered that the saturation magnetization Bs64 of the side shield 64 affects the width of the region including the boundary Bs1 between the first magnetic recording component 84a and the second magnetic recording component 84b (the region where the magnetization is unstable). In the case where the saturation magnetization Bs64 of the side shield 64 is large, the width of the region where the magnetization is unstable becomes small because the saturated region of the side shield 64 is small. On the other hand, in the case where the reproducing width Lr is small, the width of the region where the magnetization of the first magnetic recording component 84a is sensed and the width of the region where the magnetization of the second magnetic recording component 84 is sensed become small. Accordingly, in the case where the reproducing width Lr is small, the relative size of the width of the region where the magnetizations of the first magnetic recording component 84a and the second magnetic recording component 84 are sensed becomes small with respect to the width of the region including the boundary Bs1 (the region where the magnetization is unstable). Accordingly, it is considered that setting the value BR·(Lr/SG) to be high is effective for reducing the third value reproduction noise Nv3. In other words, the third value reproduction noise Nv3 can be reduced by setting the value BR to be large and setting the ratio of the side gap SG to the reproducing width Lr to be low.

In the embodiment, the saturation magnetization of the side shield 64 is increased similarly to the saturation magnetization of the write shield 63. For example, in a reference example in which sub-tracks are not provided, the controllability of the recording magnetic field in the first direction is increased by stably forming the states at the first-direction end portions of the magnetic recording components 84. To this end, the saturation magnetization of the write shield 63 is increased as much as possible. Generally, the saturation magnetization of the side shield 64 is set to be lower than the saturation magnetization of the write shield 63.

Conversely, in the embodiment, the saturation magnetization of the side shield 64 is increased similarly to the saturation magnetization of the write shield 63. Thereby, because the two sub-tracks are used, the states at the second-direction end portions of the magnetic recording components 84 can be stabilized in addition to stabilizing the states at the first-direction end portions of the magnetic recording components 84.

For example, in the embodiment, the saturation magnetization of the side shield 64 is set to be not less than 0.95 times and not more than 1 times the saturation magnetization of the write shield 63. Thereby, the states at the end portions of the magnetic recording components 84 in the first direction and the second direction can be stable.

For example, the write shield 63 includes at least one of iron or cobalt; and the side shield includes at least one of iron or cobalt. Thereby, the states at the end portions of the magnetic recording components 84 in the first direction and the second direction can be stable.

In the embodiment, the magnetic pole 61 includes, for example, a material such as FeCo, FeCoNi, etc.

In the embodiment, the reproducing width Lr is, for example, not less than 10 nanometers and not more than 50 nanometers. When the reproducing width Lr is less than 10 nanometers, the reproducing width Lr is about the same as the grain size of the magnetic recording medium 80; the reproducing of the third value is difficult; and the third value reproduction noise Nv3 increases. When the reproducing width Lr exceeds 50 nanometers, noise that originates in the reproducing unit 70 newly occurs; and the third value reproduction noise Nv3 increases.

The side gap SG is, for example, not less than 10 nanometers and not more than 90 nanometers. When the side gap SG is less than 10 nanometers, it is difficult to apply a sufficient recording magnetic field to the magnetic recording medium 80; and the reproduction noise increases. When the side gap SG exceeds 90 nanometers, the spread of the recording magnetic field in the second direction (the Y-axis direction) is large.

In the embodiment, for example, it is favorable for the side gap SG to be not more than the write gap WG. When the side gap SG exceeds the write gap WG, for example, there are cases where the recording magnetic field to the magnetic recording medium 80 generated from the second direction (the Y-axis direction) side surface of the magnetic pole 61 becomes small; and the third value reproduction noise may increase.

In the embodiment, the write gap WG is not less than 10 nanometers and not more than 30 nanometers. In the case where the write gap WG is less than 10 nanometers, it is difficult to apply a sufficient recording magnetic field to the magnetic recording medium 80; and the reproduction noise may increase. When the write gap WG becomes large, the spread of the recording magnetic field in the first direction (the X-axis direction) becomes large; and the noise component occurring when the first state St1 and the second state St2 interchange alternately in the first direction (the X-axis direction) increases. By setting the write gap WG to be 30 nanometers or less, it is possible to correct the noise component occurring when the first state St1 and the second state St2 are interchanged alternately in the first direction (the X-axis direction).

In the embodiment, the length (the first track width tw1) in the Y-axis direction (the second direction) of the first track Tr1 is not less than 15 nanometers and not more than 100 nanometers. When the first track width tw1 is less than 15 nanometers, the number of particles arranged in the Y-axis direction (the second direction) in the magnetic recording medium 80 is less than 2; and the recording of the third value is difficult. When the first track width tw1 exceeds 100 nanometers, noise due to the fly height difference between the first sub-track Ts1 and the second sub-track Ts2 becomes pronounced.

In the embodiment, the aspect ratio AR is not less than 0.4 and not more than 10.

In the magnetic recording, the number of magnetic particles of the magnetic recording medium 80 corresponding to one symbol is about 10. When the aspect ratio AR is less than 0.4, the number of particles of the magnetic recording medium 80 arranged in the second direction (the Y-axis direction) is less than 2; and the recording of the third value is difficult. On the other hand, when the aspect ratio AR exceeds 10, the size of the symbol in the first direction (the X-axis direction) becomes smaller than the grain size of the magnetic recording medium 80. As a result, the noise component that occurs when the first state St1 and the second state St2 interchange alternately in the first direction (the X-axis direction) increases. Therefore, the noise becomes pronounced when random symbols are recorded.

In the embodiment, the aspect ratio AR may be not less than 2 and not more than 10. Thereby, stable magnetic recording and reproducing are easy.

Figure 6:
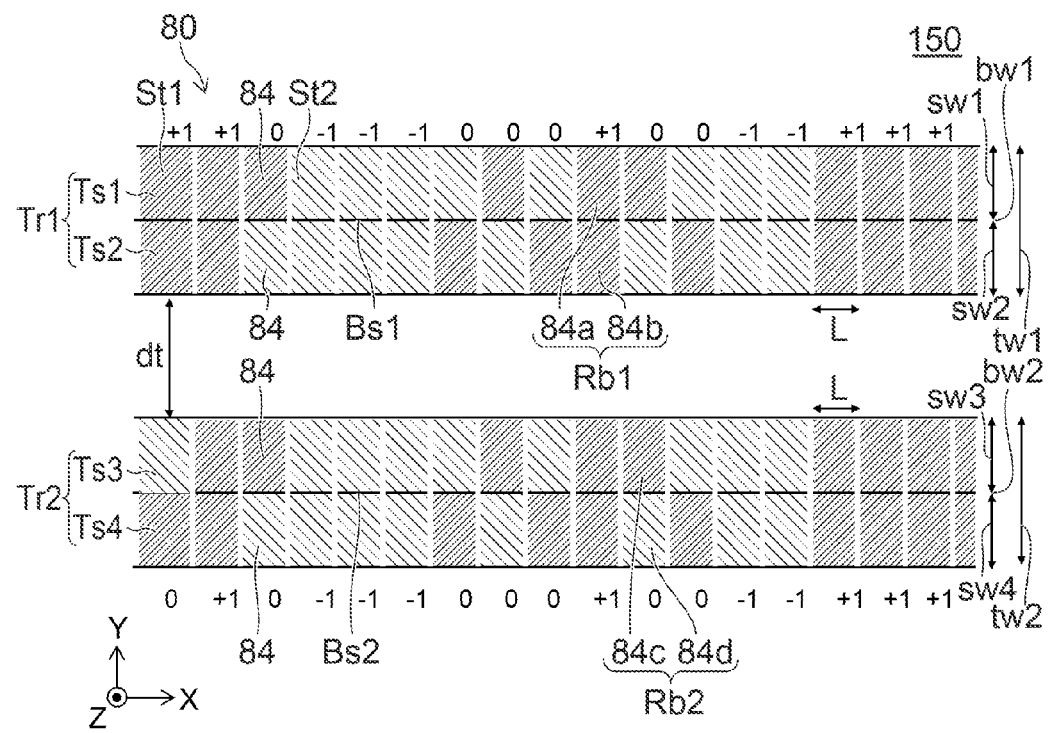
FIG. 6 is a schematic plan view illustrating a portion of the magnetic recording and reproducing device according to the first embodiment.

FIG. 6 is a schematic plan view illustrating a portion of the magnetic recording and reproducing device according to the first embodiment.

FIG. 6 shows the first track Tr1 and the second track Tr2 of the magnetic recording medium 80.

As shown in FIG. 6, the magnetic recording medium 80 further includes the second track Tr2 in addition to the first track Tr1. The second track Tr2 includes multiple second recording symbols Rb2 arranged in the first direction (the X-axis direction).

The second track Tr2 includes the third sub-track Ts3 and the fourth sub-track Ts4. The third sub-track Ts3 includes multiple third magnetic recording components 84c arranged along the first direction. The third sub-track Ts3 is arranged with the second sub-track Ts2 in the second direction (the Y-axis direction). The fourth sub-track Ts4 includes multiple fourth magnetic recording components 84d arranged along the first direction. The fourth sub-track Ts4 is arranged with the third sub-track Ts3 in the second direction.

The second sub-track Ts2 is disposed between the first sub-track Ts1 and the fourth sub-track Ts4. The third sub-track Ts3 is disposed between the second sub-track Ts2 and the fourth sub-track Ts4.

One of the multiple fourth magnetic recording components 84d is arranged in the second direction (the Y-axis direction) with one of the multiple third magnetic recording components 84c.

One of the multiple second recording symbols Rb2 is formed of the one of the multiple third magnetic recording components 84c and the one of the multiple fourth magnetic recording components 84d.

The one of the multiple third magnetic recording components 84c has a third magnetization. The one of the multiple fourth magnetic recording components 84d has a fourth magnetization.

As shown in FIG. 6, the third magnetization and the fourth magnetization are set to the first state St1 when the information to be written to the one of the multiple second recording symbols Rb2 is the first value (e.g., "+1"). The third magnetization and the fourth magnetization are set to the second state St2 when the information to be written to the one of the multiple second recording symbols Rb2 is the second value (e.g., "−1"). When the information to be written to the one of the multiple second recording symbols Rb2 is the third value (e.g., "0"), one of the third magnetization or the fourth magnetization is set to the first state St1 and the other of the third magnetization or the fourth magnetization is set to the second state St2.

The recording of the information (the control of the magnetization) is performed by the magnetic head 50 (the recording unit 60). For the second track Tr2 as well, the recording/reproducing of ternary information is performed utilizing two sub-tracks.

The sum of a third sub-track width sw3 in the second direction of the third sub-track Ts3 and a fourth sub-track width sw4 in the second direction of the fourth sub-track Ts4 is substantially the same as a second track width tw2 of the second track Tr2. The sum is not less than 0.98 times and not more than 1.02 times the second track width tw2. For example, each of the third sub-track width sw3 and the fourth sub-track width sw4 is substantially ½ of the second track width tw2.

A distance dt between the second sub-track Ts2 and the third sub-track Ts3 is longer than the distance between the first sub-track Ts1 and the second sub-track Ts2 (corresponding to the width bw1 in the second direction of the boundary Bs1). The distance dt is longer than the distance between the third sub-track Ts3 and the fourth sub-track Ts4 (corresponding to a width bw2 of a boundary Bs2 between the third sub-track Ts3 and the fourth sub-track Ts4).

Figure 7:
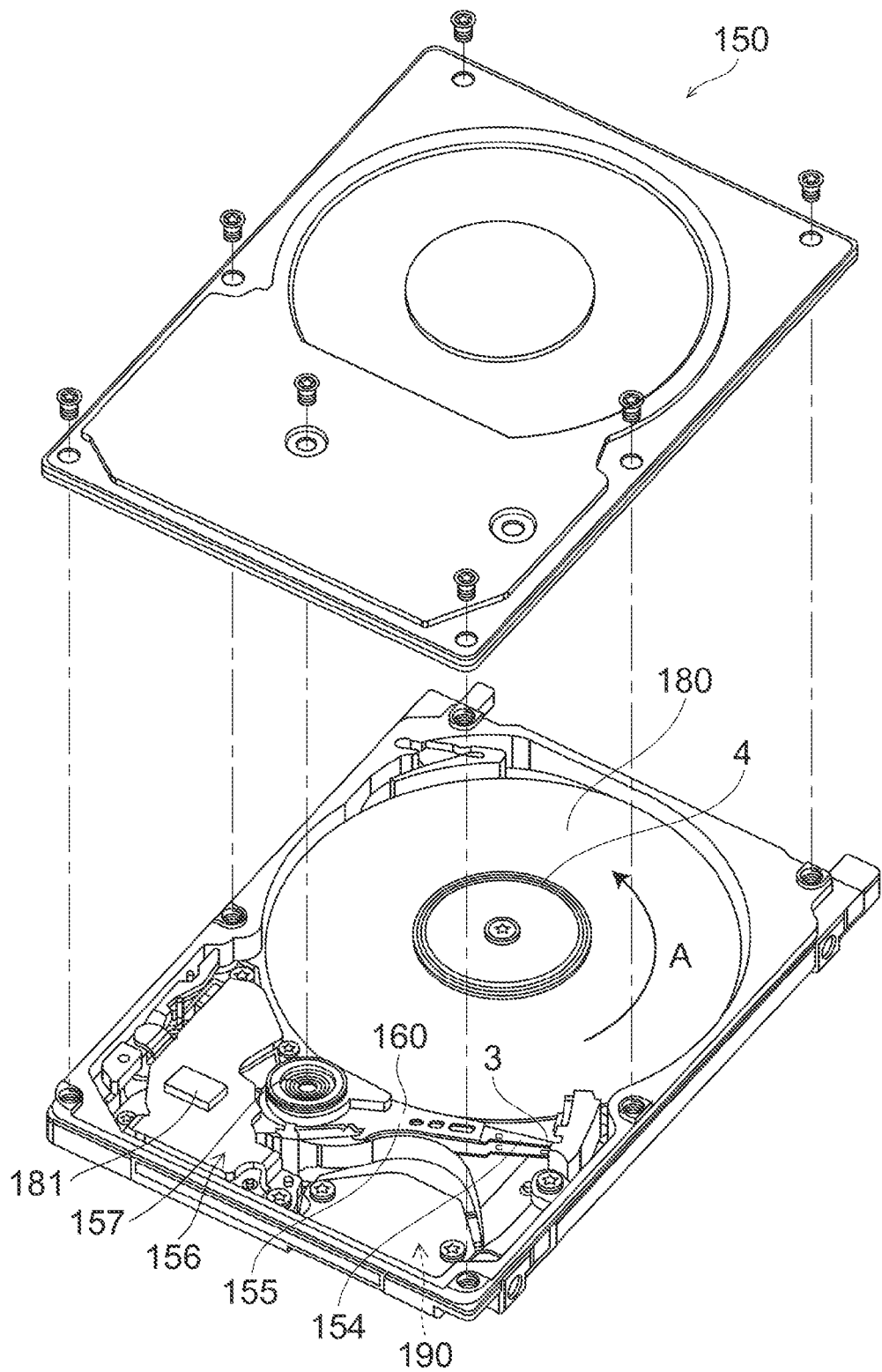
FIG. 7 is a schematic perspective view showing the magnetic recording and reproducing device according to the embodiment.

FIG. 7 is a schematic perspective view illustrating the magnetic recording and reproducing device according to the embodiment.

Figure 8A:
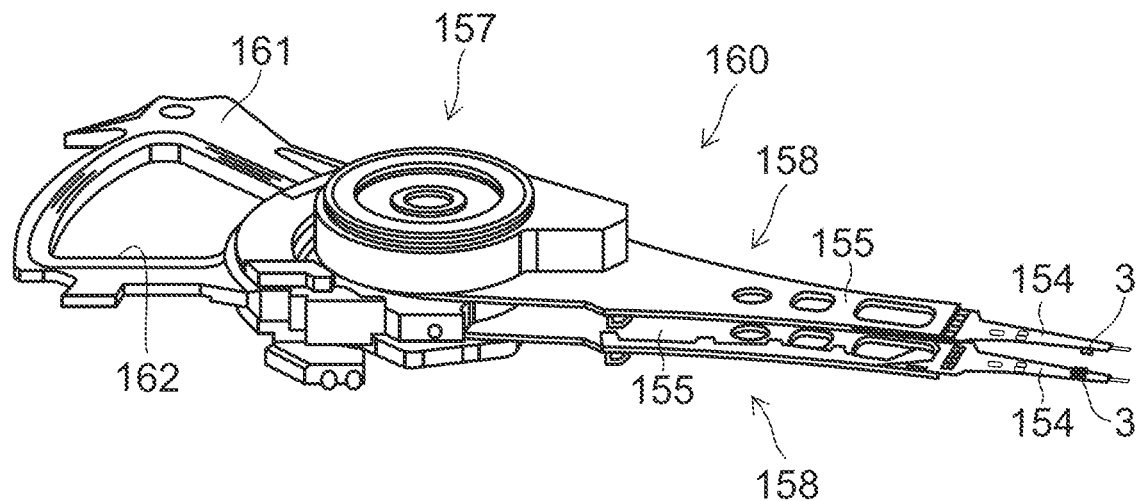
FIG. 8A and FIG. 8B are schematic perspective views showing a portion of the magnetic recording and reproducing device according to the embodiment.
Figure 8B:
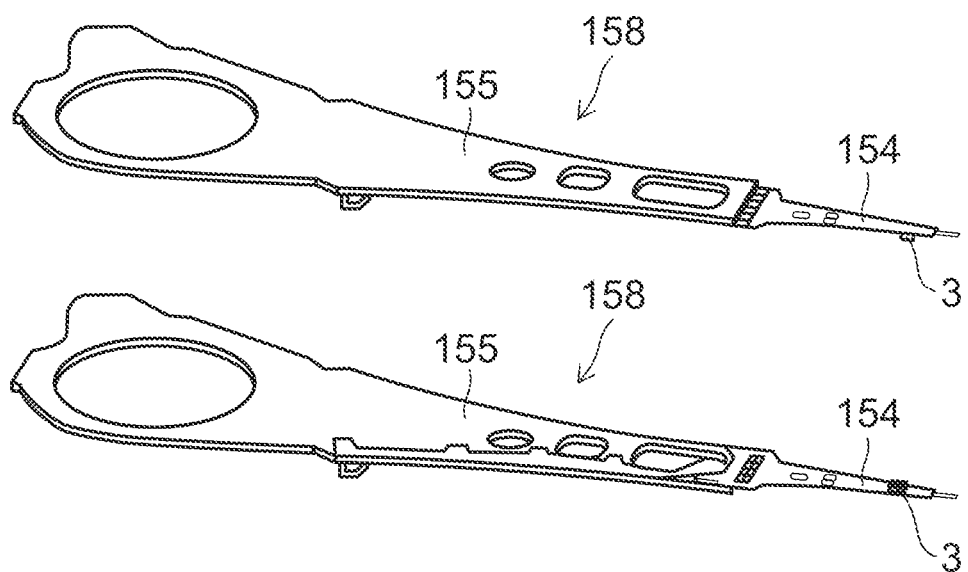

FIG. 8A and FIG. 8B are schematic perspective views illustrating a portion of the magnetic recording and reproducing device according to the embodiment.

As shown in FIG. 7, the magnetic recording and reproducing device 150 according to the embodiment is a device that uses a rotary actuator. A recording medium disk 180 is mounted to a spindle motor 4 and is rotated in the direction of arrow A by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

The head slider 3 that performs the recording and reproducing of the information stored in the recording medium disk 180 has a configuration such as that described above and is mounted to the tip of a suspension 154 having a thin-film configuration. Here, for example, one of the magnetic heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of an actuator arm 155 that includes a bobbin unit holding a drive coil, etc. A voice coil motor 156 which is one type of linear motor is provided at one other end of the actuator arm 155. The voice coil motor 156 may include a drive coil that is wound onto the bobbin unit of the actuator arm 155, and a magnetic circuit made of a permanent magnet and an opposing yoke that are disposed to oppose each other with the coil interposed. The suspension 154 has one end and one other end; the magnetic head is mounted to the one end of the suspension 154; and the actuator arm 155 is connected to the one other end of the suspension 154.

The actuator arm 155 is held by ball bearings provided at two locations on and under a bearing unit 157; and the actuator arm 155 can be caused to rotate and slide unrestrictedly by the voice coil motor 156. As a result, the magnetic head is movable to any position of the recording medium disk 180.

FIG. 8A illustrates the configuration of a portion of the magnetic recording and reproducing device and is an enlarged perspective view of a head stack assembly 160.

FIG. 8B is a perspective view illustrating a magnetic head assembly (a head gimbal assembly (HGA)) 158 which is a portion of the head stack assembly 160.

As shown in FIG. 8A, the head stack assembly 160 includes the bearing unit 157, the head gimbal assembly 158 that extends from the bearing unit 157, and a support frame 161 that extends from the bearing unit 157 in the opposite direction of the HGA and supports a coil 162 of the voice coil motor.

As shown in FIG. 8B, the head gimbal assembly 158 includes the actuator arm 155 that extends from the bearing unit 157, and the suspension 154 that extends from the actuator arm 155.

The head slider 3 is mounted to the tip of the suspension 154. One of the magnetic heads according to the embodiments is mounted to the head slider 3.

In other words, the magnetic head assembly (the head gimbal assembly) 158 according to the embodiment includes the magnetic head according to the embodiment, the head slider 3 to which the magnetic head is mounted, the suspension 154 that has the head slider 3 mounted to one end of the suspension 154, and the actuator arm 155 that is connected to the other end of the suspension 154.

The suspension 154 includes, for example, lead wires (not shown) that are for writing and reproducing signals, for a heater that adjusts the fly height, for a spin torque oscillator, etc. The lead wires are electrically connected to electrodes of the magnetic head embedded in the head slider 3.

A signal processor 190 is provided to write and reproduce the signals to and from the magnetic recording medium by using the magnetic head. For example, the signal processor 190 is provided on the backside of the drawing of the magnetic recording and reproducing device 150 illustrated in FIG. 7. The input/output lines of the signal processor 190 are electrically connected to the magnetic head by being connected to electrode pads of the head gimbal assembly 158.

Thus, the magnetic recording and reproducing device 150 according to the embodiment includes a magnetic recording medium, the magnetic head according to the embodiment recited above, a movable unit that is relatively movable in a state in which the magnetic recording medium and the magnetic head are separated from each other or in contact with each other, a position controller that aligns the magnetic head at a prescribed recording position of the magnetic recording medium, and a signal processor that writes and reproduces signals to and from the magnetic recording medium by using the magnetic head.

In other words, the recording medium disk 180 is used as the magnetic recording medium recited above.

The movable unit recited above may include the head slider 3.

The position controller recited above may include the head gimbal assembly 158.

Thus, the magnetic recording and reproducing device 150 according to the embodiment includes the magnetic recording medium, the magnetic head assembly according to the embodiment, and the signal processor that writes and reproduces signals to and from the magnetic recording medium by using the magnetic head mounted to the magnetic head assembly.

According to the embodiments, a magnetic recording and reproducing device is provided in which stable magnetic recording and reproducing are possible.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording and reproducing devices such as magnetic recording mediums, magnetic heads, recording units, reproducing units, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording and reproducing devices practicable by an appropriate design modification by one skilled in the art based on the magnetic recording and reproducing devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording and reproducing device, comprising:
a magnetic recording medium including a first track including
a first sub-track extending along a first direction, and
a second sub-track extending along the first direction, the second sub-track being arranged with the first sub-track in a second direction intersecting the first direction; and
a magnetic head including a recording unit and a reproducing unit,
the recording unit recording information in the magnetic recording medium,
the reproducing unit reproducing the information recorded in the magnetic recording medium,
the recording unit including
a magnetic pole,
a write shield separated from the magnetic pole in the first direction, and
a side shield separated from the magnetic pole in the second direction,
the reproducing unit including a reproducing element having a reproducing width along the second direction,
the first track including a plurality of first recording symbols,
the first sub-track including a plurality of first magnetic recording components,
the second sub-track including a plurality of second magnetic recording components,
one of the first recording symbols being formed of one of the first magnetic recording components and one of the second magnetic recording components,
the one of the first magnetic recording components having a first magnetization,
the one of the second magnetic recording components having a second magnetization,
the magnetic head setting the first magnetization and the second magnetization to a first state when information to be written to the one of the first recording symbols is a first value,
the magnetic head setting the first magnetization and the second magnetization to a second state when the information to be written to the one of the first recording symbols is a second value,
the magnetic head setting one of the first magnetization or the second magnetization to the first state and setting one other of the first magnetization or the second magnetization to the second state when the information to be written to the one of the first recording symbols is a third value,
the reproducing width being not less than 1.2 times a side gap along the second direction between the magnetic pole and the side shield.

2. The device according to claim 1, wherein the reproducing unit reproduces the recorded information by sensing, along the first direction, values corresponding to the first magnetization and the second magnetization while opposing the first sub-track, the second sub-track, and a boundary between the first sub-track and the second sub-track.

3. The device according to claim 1, wherein
the first track has an aspect ratio,
the aspect ratio is a ratio of a first track width in the second direction of the first track to a length in the first direction of the one of the first magnetic recording components, and
a product of the aspect ratio and the reproducing width is not less than 3 times the side gap.

4. The device according to claim 3, wherein the aspect ratio is not less than 0.4 and not more than 10.

5. The device according to claim 1, wherein a product of the reproducing width and a ratio of a saturation magnetization of the side shield to a saturation magnetization of the write shield is not less than 1.2 times the side gap.

6. The device according to claim 1, wherein the ratio of a saturation magnetization of the side shield to a saturation magnetization of the write shield is not less than 0.95 and not more than 1.

7. The device according to claim 1, wherein
the write shield includes at least one of iron or cobalt, and
the side shield includes at least one of iron or cobalt.

8. The device according to claim 1, wherein a sum of a first sub-track width in the second direction of the first sub-track and a second sub-track width in the second direction of the second sub-track is not less than 0.98 times and not more than 1.02 times a first track width in the second direction of the first track.

9. The device according to claim 1, wherein
a width in the second direction of the magnetic pole is greater than a length in the second direction of the one of the first magnetic recording components, and
the width in the second direction of the magnetic pole is greater than a length in the second direction of the one of the second magnetic recording components.

10. The device according to claim 1, wherein
a width in the second direction of the magnetic pole is not less than 1 times and not more than 4 times a length in the second direction of the one of the first magnetic recording components, and
the width in the second direction of the magnetic pole is not less than 1 times and not more than 4 times a length in the second direction of the one of the second magnetic recording components.

11. The device according to claim 1, wherein the magnetic head records the information in the first sub-track and the second sub-track by shingled magnetic recording.

12. The device according to claim 1, wherein
a direction of the first magnetization in the first state and a direction of the second magnetization in the first state intersect a plane including the first direction and the second direction, and
the direction of the first magnetization in the second state and the direction of the second magnetization in the second state intersect the plane.

13. The device according to claim 1, wherein
the magnetic recording medium further includes a second track including a plurality of second recording symbols arranged in the first direction,
the second track includes
a third sub-track arranged with the second sub-track in the second direction, the third sub-track including a plurality of third magnetic recording components arranged along the first direction, and
a fourth sub-track arranged with the third sub-track in the second direction, the fourth sub-track including a plurality of fourth magnetic recording components arranged along the first direction,
the second sub-track being disposed between the first sub-track and the fourth sub-track, the third sub-track being disposed between the second sub-track and the fourth sub-track, one of the fourth magnetic recording components being arranged in the second direction with one of the third magnetic recording components, one of the second recording symbols being formed of the one of the third magnetic recording components and the one of the fourth magnetic recording components, the one of the third magnetic recording components having a third magnetization, the one of the fourth magnetic recording components having a fourth magnetization, the magnetic head setting the third magnetization and the fourth magnetization to the first state when information to be written to the one of the second recording symbols is the first value, the magnetic head setting the third magnetization and the fourth magnetization to the second state when the information to be written to the one of the second recording symbols is the second value, the magnetic head setting one of the third magnetization or the fourth magnetization to the first state and setting one other of the third magnetization or the fourth magnetization to the second state when the information to be written to the one of the second recording symbols is the third value.

14. The device according to claim 13, wherein a distance between the second sub-track and the third sub-track is longer than a distance between the first sub-track and the second sub-track and longer than a distance between the third sub-track and the fourth sub-track.

15. The device according to claim 1, wherein the reproducing width is not less than 0.4 times and not more than 1 times a length in the second direction of the first track.

16. The device according to claim 1, wherein the reproducing width is not less than 10 nanometers and not more than 50 nanometers.

17. The device according to claim 1, wherein the side gap is not less than 10 nanometers and not more than 90 nanometers.

18. The device according to claim 1, wherein the magnetic head has a write gap along the first direction between the magnetic pole and the write shield, and the side gap is not more than the write gap.

19. The device according to claim 18, wherein the write gap is not less than 10 nanometers and not more than 30 nanometers.

20. A plurality of the magnetic recording and reproducing devices according to claim 1, wherein a length in the second direction of the first track is not less than 15 nanometers and not more than 100 nanometers.

* * * * *